US008656080B2

(12) United States Patent
Shin

(10) Patent No.: US 8,656,080 B2
(45) Date of Patent: Feb. 18, 2014

(54) WIRELESS CHARGING METHOD FOR WIRELESS COMPUTER PERIPHERAL DEVICE

(75) Inventor: Yu-Yen Shin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 144 days.

(21) Appl. No.: 13/279,500

(22) Filed: Oct. 24, 2011

(65) Prior Publication Data

US 2013/0047008 A1    Feb. 21, 2013

(30) Foreign Application Priority Data

Aug. 19, 2011    (TW) .............................. 100129813 A

(51) Int. Cl.
*G06F 1/00*    (2006.01)

(52) U.S. Cl.
USPC ........... 710/310; 320/108; 320/136; 320/137; 455/127.1; 455/129; 370/338

(58) Field of Classification Search
USPC ........ 713/310; 320/108, 136, 137; 455/127.1, 455/129; 370/338
See application file for complete search history.

(56) References Cited

U.S. PATENT DOCUMENTS

| 7,400,253 | B2 * | 7/2008 | Cohen ......................... 340/572.1 |
| 7,606,540 | B2 * | 10/2009 | Yoon ........................... 455/127.1 |
| 7,639,994 | B2 * | 12/2009 | Greene et al. ................. 455/129 |
| 7,737,656 | B2 * | 6/2010 | Chen et al. .................... 320/108 |
| 8,159,090 | B2 * | 4/2012 | Greene et al. ................. 307/104 |
| 8,330,298 | B2 * | 12/2012 | Scherbenski et al. ......... 307/104 |
| 8,335,937 | B2 * | 12/2012 | Qi et al. ........................ 713/320 |
| 8,362,745 | B2 * | 1/2013 | Tinaphong .................... 320/108 |
| 2006/0281435 | A1 * | 12/2006 | Shearer et al. .............. 455/343.1 |
| 2009/0309550 | A1 * | 12/2009 | Liu ................................ 320/137 |
| 2011/0127953 | A1 * | 6/2011 | Walley et al. ................. 320/108 |
| 2011/0260839 | A1 * | 10/2011 | Cook et al. .................... 340/10.4 |
| 2011/0276911 | A1 * | 11/2011 | Choi ............................. 715/769 |
| 2012/0054790 | A1 * | 3/2012 | Kim ............................... 725/30 |
| 2012/0213213 | A1 * | 8/2012 | Hsueh et al. .................. 370/338 |
| 2012/0303980 | A1 * | 11/2012 | Culbert et al. ................ 713/300 |
| 2012/0316414 | A1 * | 12/2012 | Greene ......................... 600/365 |
| 2013/0005249 | A1 * | 1/2013 | Nahidipour .................. 455/41.1 |

OTHER PUBLICATIONS

Integrated Device Technology—"Single Chip Wireless Power Transmitter IC for TX-A1—IDTP9030"; Dated 2012, 28 pages.*
Press Release—"IDT Wireless Power Solutions Selected by Primax for Wireless Charging Accessories"; Dated Oct. 24, 2012; 2 pages.*
Powercast—"RF Energy Harvesting and Wireless Power for Low-Power Applications"; Dated Apr. 6, 2012; 22 pages.*

(Continued)

*Primary Examiner* — Brian Misiura
(74) *Attorney, Agent, or Firm* — Evan R. Witt; Kirton McConkie

(57) ABSTRACT

A wireless charging method of the present invention is applied to a wireless computer peripheral device. Firstly, the access points that are able to emit wireless radio waves and located near a computer are searched by the computer. After a target access point is selected, the connection information about the target access point is transmitted to the wireless computer peripheral device. According to the connection information, the connection between the wireless computer peripheral device and the target access point is established. Consequently, the charging signal can be acquired by the wireless computer peripheral device, and the wireless charging operation will be performed. By the wireless charging method of the present invention, the wireless charging feasibility and convenience will be enhanced.

20 Claims, 3 Drawing Sheets

(56) References Cited

OTHER PUBLICATIONS

2006 IEEE International Conference on Systems, Man, and Cybernetics—"Powering Wireless Sensor Nodes using Ambient RF Energy"; Dated Oct. 8, 2006; 6 pages.*
Powercast—"Product Datasheet—P2110—915 MHz RF Powerharvester Receiver"; Dated Apr. 2010; 12 pages.*
Powercast—"Product Datasheet—P110—915 MHz RF Powerharvester Receiver"; Dated Apr. 2010; 10pages.*
Powercast—"Powerharvester Receivers—Wireless power components for converting RF energy to DC power"; No Date provided, 1 page.*
WiFi Alliance - "Wi-Fi Certified Wi-Fi Direct: Connect with the possibilities"—Dated Oct. 25, 2010; 24 pages.*

* cited by examiner

… (1)

WIRELESS CHARGING METHOD FOR WIRELESS COMPUTER PERIPHERAL DEVICE

FIELD OF THE INVENTION

The present invention relates to a wireless charging method, and more particularly to a wireless charging method for a wireless computer peripheral device.

BACKGROUND OF THE INVENTION

With the growing maturity of a wireless transmission technology, the conventional wired computer peripheral devices are gradually replaced by wireless computer peripheral devices. Since the wireless computer peripheral device is not in communication with the computer through a physical connecting wire, the wireless computer peripheral device fails to directly acquire electric power from the computer. For maintaining normal operations of the wireless computer peripheral device, an external electric energy storage system (e.g. a battery) is essential. In a case that the power consumption of the wireless computer peripheral device is too high, the battery should be frequently replaced with a new one. The way of frequently replacing the battery may increase the operating cost. Moreover, if the battery recycling activity is not truly done, an environmental pollution problem occurs. For solving these drawbacks, a wireless charging technology has been disclosed.

FIG. 1 schematically illustrates the architecture of a wireless computer peripheral device for implementing a wireless charging method according to the prior art. The conventional wireless computer peripheral device comprises a wireless receiver 10 and a wireless input module 20. The wireless receiver 10 is connected with a computer 30. The wireless input module 20 comprises a wireless transceiver 21 and an electric energy converting unit 22. Once the electric energy of the wireless input module 20 is lower than a threshold value, a charging signal is automatically transmitted from the wireless transceiver 21 to the wireless receiver 10. After the charging signal is received by the wireless receiver 10, an electromagnetic wave is transmitted back to the wireless transceiver 21 in response to the charging signal. By the electric energy converting unit 22, the electromagnetic wave is converted into electric energy. Consequently, the wireless input module 20 is charged by the electric energy.

From the above discussions, the electromagnetic wave for charging is issued by the wireless receiver 10. However, the power supply terminal is practically the computer 30, which is connected to the wireless receiver 10. The design of the conventional wireless charging method may have no substantial impact on the desktop computer. On the other hand, if the conventional wireless charging method is applied to the notebook computer with the storage-type power source, the power consumption of the wireless computer is largely increased without doubt. Under this circumstance, the use time of the notebook computer is reduced, and the inconvenience of using the notebook computer is increased.

SUMMARY OF THE INVENTION

The present invention provides a wireless charging method for a wireless computer peripheral device by selecting a proper power supply terminal.

In accordance with an aspect of the present invention, there is provided a wireless charging method for a wireless computer peripheral device. The wireless computer peripheral device is in communication with a computer. The wireless charging method includes the following steps. Firstly, the step (A) is performed to judge whether a voltage of the wireless computer peripheral device is lower than a threshold value. If the voltage of the wireless computer peripheral device is lower than the threshold value, a notification signal is transmitted to the computer. Then, in the step (B), a response signal is received from the computer, wherein the response signal includes a connection information about a target access point. Then, in the step (C), a charging request is transmitted to the target access point. Then, in the step (D), a packet is received. Then, the step (E) is performed to judge whether the packet is a charging signal. If the packet is the charging signal, the packet is converted into an electric energy and the electric energy is stored.

In an embodiment, if the packet is not the charging signal in the step (E), the wireless charging method further includes a step of judging whether the packet is transmitted from the computer. If the packet is transmitted from the computer, a content of the packet is analyzed and an action command is generated according to the content of the packet. Whereas, if the packet is not transmitted from the computer, no action is done.

In an embodiment, the target access point is the computer.

In an embodiment, the target access point is a wireless base station or a wireless router.

In an embodiment, the connection information includes an identification code of the target access point.

In an embodiment, the connection information includes an identification code and a password of the target access point.

In an embodiment, the computer and the wireless computer peripheral device are operated in a Wi-Fi direct communication mode.

In an embodiment, the wireless computer peripheral device is a wireless mouse.

In an embodiment, the wireless computer peripheral device has an electric energy converting unit for converting the charging signal into the electric energy.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
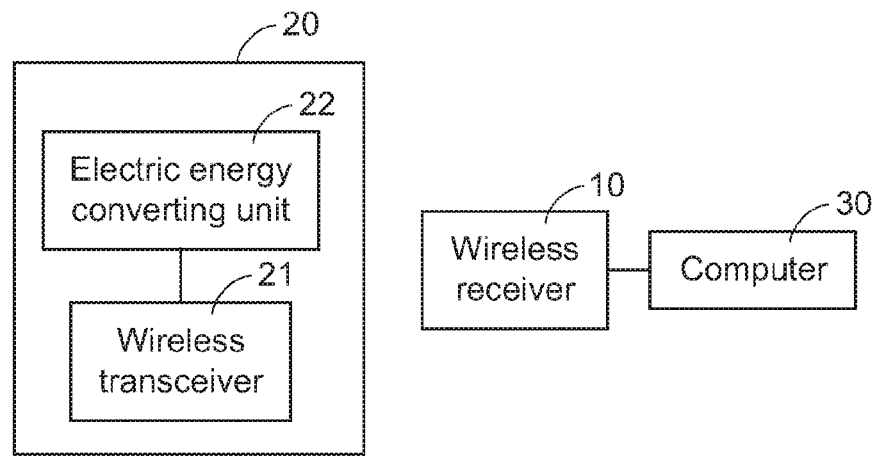
FIG. 1 schematically illustrates the architecture of a wireless computer peripheral device for implementing a wireless charging method according to the prior art.
Figure 2:
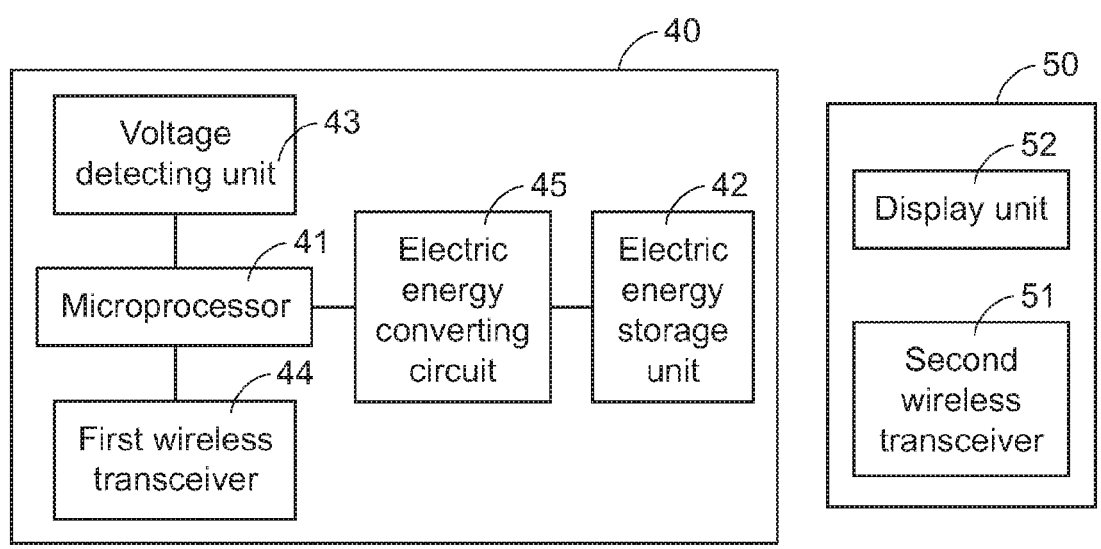
FIG. 2 schematically illustrates the communication between a wireless computer peripheral device and a computer according to an embodiment of the present invention.

FIG. 2 schematically illustrates the communication between a wireless computer peripheral device and a computer according to an embodiment of the present invention. As shown in FIG. 2, the wireless computer peripheral device 40 is in communication with the computer 50 by a wireless transmission technology. The wireless computer peripheral device 40 comprises a microprocessor 41, an electric energy storage unit 42, a voltage detecting unit 43, a first wireless transceiver 44, and an electric energy converting circuit 45. The computer 50 comprises a second wireless transceiver 51 and a display unit 52.

The microprocessor 41 is electrically connected with the voltage detecting unit 43, the first wireless transceiver 44 and the electric energy converting circuit 45. The electric energy storage unit 42 is electrically connected with the electric energy converting circuit 45. The voltage detecting unit 43 is used for detecting the voltage of the electric energy storage unit 42. The electric energy converting circuit 45 is used for converting a specified wireless signal (e.g. a charging signal) into an electric energy.

In this embodiment, the wireless computer peripheral device 40 is a wireless input device, for example a wireless mouse. The electric energy storage unit 42 is a chargeable battery. The second wireless transceiver 51 is built in the computer 50 for receiving and emitting wireless signals. Moreover, the first wireless transceiver 44 and the second wireless transceiver 51 are used for transmitting data and signals in a Wi-Fi direct communication mode. The above descriptions presented herein for purpose of illustration only.

Figure 3:
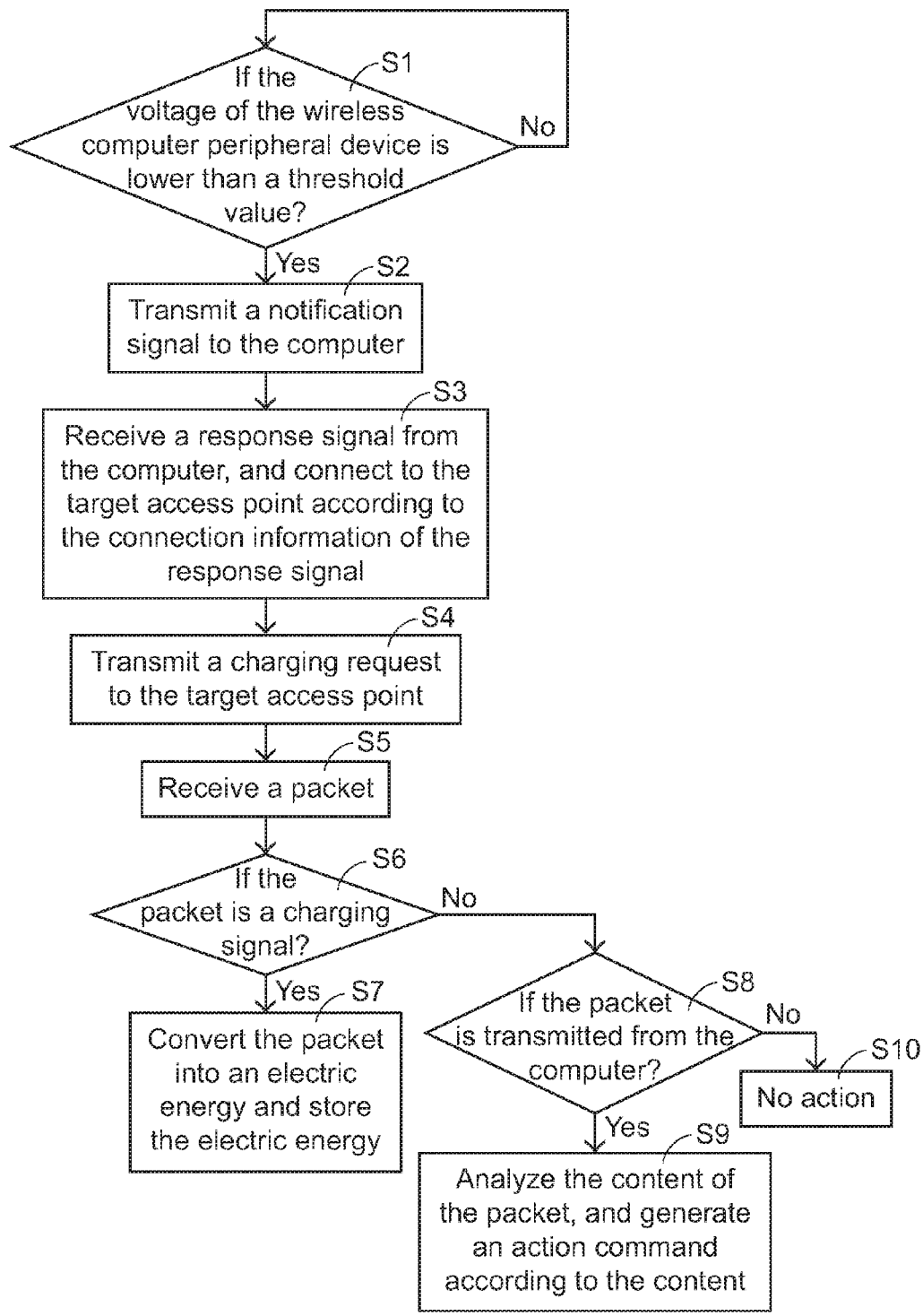
FIG. 3 is a flowchart schematic illustrating a wireless charging method for a wireless computer peripheral device according to an embodiment of the present invention.

FIG. 3 is a flowchart schematic illustrating a wireless charging method for a wireless computer peripheral device according to an embodiment of the present invention. Firstly, in the step S1, the microprocessor 41 judges whether the voltage of the wireless computer peripheral device 40 is lower than a threshold value according to the detecting result of the voltage detecting unit 43. For example, the preset threshold value is 2 volts.

If the voltage is higher than or equal to the threshold value, it means that the electric energy stored in the electric energy storage unit 42 is sufficient. Since it is not necessary to perform the charging operation, the step S1 is repeatedly done. On the other hand, if the voltage is lower than the threshold value, it means that the electric energy stored in the electric energy storage unit 42 is insufficient. Meanwhile, a charging operation is automatically performed, and thus the step S2 is done.

Then, in the step S2, the first wireless transceiver 44 of the wireless computer peripheral device 40 issues a notification signal to the second wireless transceiver 51 of the computer 50. After the notification signal is received by the second wireless transceiver 51, the computer 50 starts to search the access points that are able to emit Wi-Fi wireless radio waves and located near the computer 50. Then, a target access point is automatically or manually selected from these access points to be used as a power supply terminal for performing the wireless charging operation. In this embodiment, the access point includes the computer 50 itself, a wireless base station near the computer 50, or a wireless router.

Figure 4:
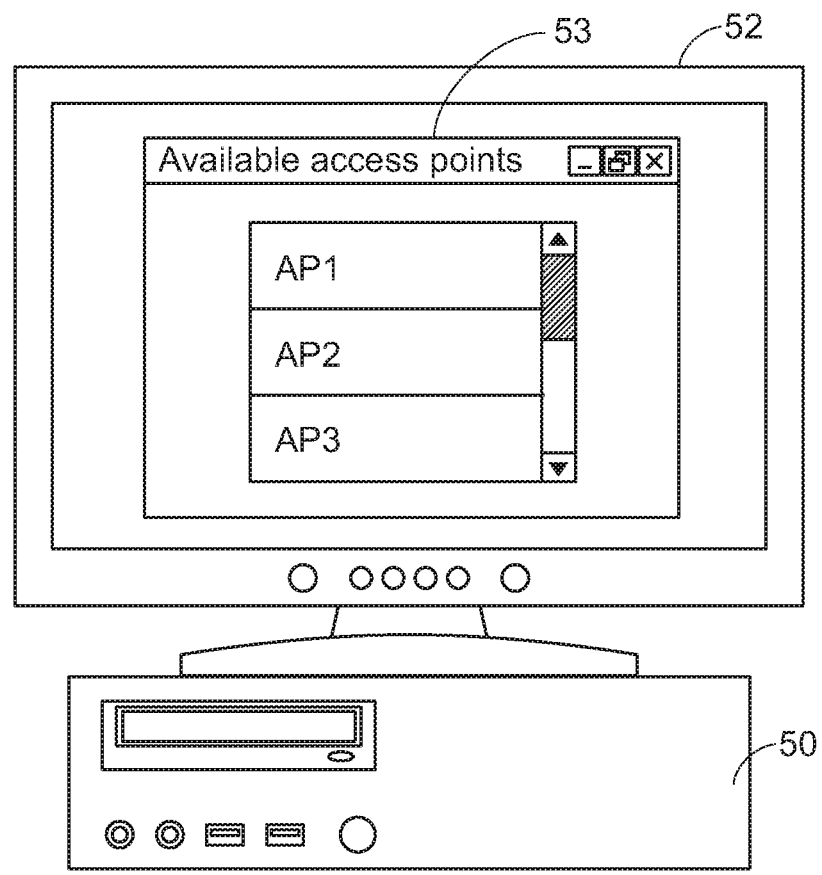
FIG. 4 schematically illustrates a search list created by the wireless charging method according to the embodiment of the present invention.

The way of selecting the target access point is similar to the conventional way of selecting and wirelessly connecting to a wireless base station. For example, the target access point may be automatically selected by the computer 50 according to the strength of the wireless radio wave. Alternatively, another way of selecting the target access point may be done by referring to FIG. 4. FIG. 4 schematically illustrates a search list created by the wireless charging method according to the embodiment of the present invention. As shown in FIG. 4, a search list 53 containing the selected access points AP1, AP2 and AP3 is shown on the display unit 52 of the computer 50. Consequently, the user may select the target access point from the access points AP1, AP2 and AP3. Moreover, for protecting the target access point, the identification code or the password corresponding to the target access point may be inputted by the user via the computer 50.

After the target access point has been selected, a response signal is sent back to the first wireless transceiver 44 of the wireless computer peripheral device 40 from the second wireless transceiver 51 of the computer 50. The response signal includes a connection information about the target access point. In a case that the protection of the target access point is not needed, the connection information includes the identification code of the target access point. Whereas, in a case that the protection of the target access point is needed, the connection information includes the identification code and the password of the target access point. An example of the identification code corresponding to the target access point includes but is not limited to a service set identifier (SSID) of the target access point.

After the response signal is received by the first wireless transceiver 44 of the wireless computer peripheral device 40, the connection between the wireless computer peripheral device 40 and the target access point is established according to the connection information of the response signal (in the step S3).

After the connection between the wireless computer peripheral device 40 and the target access point is established, a charging request is transmitted from the first wireless transceiver 44 of the wireless computer peripheral device 40 to the target access point (in the step S4). After the charging request is received by the target access point, the target access point starts to issue a charging signal to the wireless computer peripheral device 40.

Then, in the step S5, a packet is received by the first wireless transceiver 44 of the wireless computer peripheral device 40.

Then, in the step S6, the microprocessor 41 of the wireless computer peripheral device 40 judges whether the received packet is a charging signal. If the packet is the charging signal, the step S7 is performed. In the step S7, the packet is converted into an electric energy by the electric energy converting circuit 45, and the electric energy is stored in the electric energy storage unit 42. Meanwhile, the wireless charging purpose of the wireless computer peripheral device 40 is achieved.

Moreover, the wireless computer peripheral device 40 may be used for implementing some additional functions. That is, according to the command from the computer 50, the wireless computer peripheral device 40 implements a corresponding function. For example, the wireless computer peripheral device 40 may emit a light beam in response to the reception of an electronic mail or vibrate in response to a gaming content. For allowing the wireless computer peripheral device 40 to implement the corresponding function, the packet not belonging to the charging signal should be further analyzed. Consequently, if the microprocessor 41 judges that the received packet is not the charging signal, the step S8 is performed.

In the step S8, the microprocessor 41 of the wireless computer peripheral device 40 judges whether the packet is transmitted from the computer 50. If the packet is transmitted from the computer 50, the step S9 is performed to analyze a content of the packet and generate an action command according to the content of the packet. According to the action command, the wireless computer peripheral device 40 may emit a light beam or vibrate for example. Whereas, if the packet is not transmitted from the computer 50, no action will be done.

From the above description, the wireless charging method of the present invention is applied to a wireless computer peripheral device. Firstly, the access points that are able to emit wireless radio waves and located near the computer are searched by the computer. After a target access point is selected, the connection information about the target access point is transmitted to the wireless computer peripheral device. According to the connection information, the connection between the wireless computer peripheral device and the target access point is established. Consequently, the charging signal can be acquired by the wireless computer peripheral device, and the wireless charging operation will be performed. By the wireless charging method of the present invention, the wireless resources in the environment can be effectively utilized. Moreover, in a case that the computer is powered by the storage-type power source, other access point may be selectively used as the power supply terminal for the wireless computer peripheral device without the need of consuming excess electric energy of the storage-type power source. As a consequence, the wireless charging feasibility and convenience will be enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging method for a wireless computer peripheral device, said wireless computer peripheral device being in communication with a computer, said wireless charging method comprising steps of:
   (A) judging whether a voltage of said wireless computer peripheral device is lower than a threshold value, wherein if said voltage of said wireless computer peripheral device is lower than said threshold value, a notification signal is transmitted to said computer;
   (B) receiving a response signal from said computer, wherein said response signal includes a connection information about a target access point;
   (C) transmitting a charging request to said target access point;
   (D) receiving a packet; and
   (E) judging whether said packet is a charging signal, wherein if said packet is said charging signal, said packet is converted into an electric energy and said electric energy is stored, wherein if said packet is not said charging signal in said step (E), said wireless charging method further comprises a step of judging whether said packet is transmitted from said computer, wherein if said packet is transmitted from said computer, a content of said packet is analyzed and an action command is generated according to said content of said packet, wherein if said packet is not transmitted from said computer, no action is done.

2. The wireless charging method according to claim 1 wherein said target access point is said computer.

3. The wireless charging method according to claim 1 wherein said target access point is a wireless base station or a wireless router.

4. The wireless charging method according to claim 1 wherein said connection information includes an identification code of said target access point.

5. The wireless charging method according to claim 1 wherein said connection information includes an identification code and a password of said target access point.

6. The wireless charging method according to claim 1 wherein said computer and said wireless computer peripheral device are operated in a Wi-Fi direct communication mode.

7. The wireless charging method according to claim 1 wherein said wireless computer peripheral device is a wireless mouse.

8. The wireless charging method according to claim 1 wherein said wireless computer peripheral device has an electric energy converting unit for converting said charging signal into said electric energy.

9. A wireless charging method for a wireless computer peripheral device, said wireless computer peripheral device being in communication with a computer, said wireless charging method comprising steps of:
   (A) judging whether a voltage of said wireless computer peripheral device is lower than a threshold value, wherein if said voltage of said wireless computer peripheral device is lower than said threshold value, a notification signal is transmitted to said computer;
   (B) receiving a response signal from said computer, wherein said response signal includes a connection information about a target access point, wherein said connection information includes an identification code of said target access point;
   (C) transmitting a charging request to said target access point;
   (D) receiving a packet; and
   (E) judging whether said packet is a charging signal, wherein if said packet is said charging signal, said packet is converted into an electric energy and said electric energy is stored.

10. The wireless charging method according to claim 9 wherein said target access point is said computer.

11. The wireless charging method according to claim 9 wherein said target access point is a wireless base station or a wireless router.

12. The wireless charging method according to claim 9 wherein said computer and said wireless computer peripheral device are operated in a Wi-Fi direct communication mode.

13. The wireless charging method according to claim 9 wherein said wireless computer peripheral device is a wireless mouse.

14. The wireless charging method according to claim 9 wherein said wireless computer peripheral device has an electric energy converting unit for converting said charging signal into said electric energy.

15. A wireless charging method for a wireless computer peripheral device, said wireless computer peripheral device being in communication with a computer, said wireless charging method comprising steps of:
   (A) judging whether a voltage of said wireless computer peripheral device is lower than a threshold value, wherein if said voltage of said wireless computer peripheral device is lower than said threshold value, a notification signal is transmitted to said computer;
   (B) receiving a response signal from said computer, wherein said response signal includes a connection information about a target access point, wherein said connection information includes an identification code and a password of said target access point;
   (C) transmitting a charging request to said target access point;
   (D) receiving a packet; and
   (E) judging whether said packet is a charging signal, wherein if said packet is said charging signal, said packet is converted into an electric energy and said electric energy is stored.

16. The wireless charging method according to claim 15 wherein said target access point is said computer.

17. The wireless charging method according to claim 15 wherein said target access point is a wireless base station or a wireless router.

18. The wireless charging method according to claim 15 wherein said computer and said wireless computer peripheral device are operated in a Wi-Fi direct communication mode.

19. The wireless charging method according to claim 15 wherein said wireless computer peripheral device is a wireless mouse.

20. The wireless charging method according to claim 15 wherein said wireless computer peripheral device has an electric energy converting unit for converting said charging signal into said electric energy.

* * * * *